W. LINDON.
Velocipede.

No. 88,574. Patented April 6, 1869.

United States Patent Office.

WILLIAM LINDON, OF NEW HAVEN, CONNECTICUT.

Letters Patent No. 88,574, dated April 6, 1869.

IMPROVED VELOCIPEDE.

The Schedule referred to in these Letters Patent and making part of the same.

*To all whom it may concern:*

Figure 1:
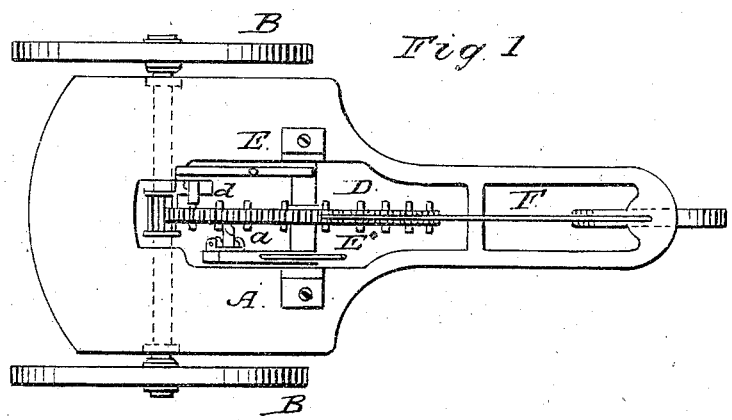
Figure 2:
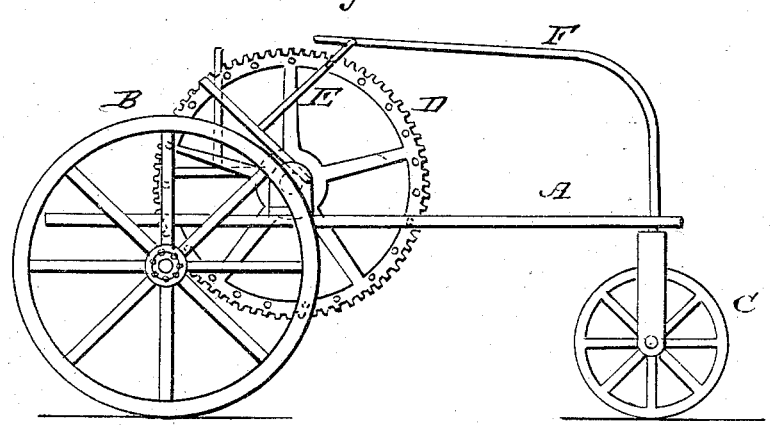

Be it known that I, WILLIAM LINDON, of New Haven, in the county of New Haven, and State of Connecticut, have invented a new Improvement in Velocipedes; and I do hereby declare the following, when taken in connection with the accompanying drawings, and the letters of reference marked thereon, to be a full, clear, and exact description of the same, and which said drawings constitute part of this specification, and represent, in Figure 1, a top view, and in Figure 2, a side view.

This invention relates to an improvement in the carriage commonly known as a velocipede, and to the class constructed with three wheels; and The invention consists in the arrangement of a ratchet-wheel with a pair of pawls, the one to alternate with the other, in their operation to work the ratchet, the said wheel being geared so as to drive the two connected wheels.

To enable others to construct and use my improvement, I will fully describe the same as illustrated in the accompanying drawings.

A is the body of the carriage, provided with an axle and two wheels, B, and with a guiding-wheel, C.

D is a ratchet-wheel.

$a$ and $d$, the two pawl-levers, both hung to the axle of the wheel D.

I construct the wheel D with pins, or teeth upon its two sides, as seen in fig. 1, and the two pawls arranged so that while they may be freely raised and passed over the pins, or teeth on the wheel, the pawls will catch on to the teeth, or pins, and so as to descend only as the wheel D is turned.

I propose to operate the two pawls by the feet, one foot upon each, and to raise the pawls after they have been depressed.

I fix a lever, E, on each, so that the operator can raise the levers with his hands, or he may, by a stirrup to each pawl-lever, so that raising the foot will raise the levers.

The wheel D is geared to the axle of the two wheels, so that as it revolves, it will cause the axle and wheels to revolve and propel the carriage.

F is the guiding-lever, connected to the wheel C, by which the direction of the carriage is governed.

Having fully described my invention,

What I claim as new and useful, and desire to secure by Letters Patent, is—

The two pawl-levers $a$ and $d$, with their respective pawls combined with the toothed and ratchet-wheel D, so as to operate in the manner herein set forth.

WILLIAM LINDON.

Witnesses:
J. H. SHUMWAY,
A. J. TIBBITS.